(12) United States Patent
Trom

(10) Patent No.: US 7,832,437 B2
(45) Date of Patent: Nov. 16, 2010

(54) TREE FELLING HEAD

(75) Inventor: Mike Trom, Blooming Prairie, MN (US)

(73) Assignee: Caterpillar Forest Products Inc, Peoria, IL (US)

( * ) Notice: Subject to any disclaimer, the term of this patent is extended or adjusted under 35 U.S.C. 154(b) by 367 days.

(21) Appl. No.: 11/874,021

(22) Filed: Oct. 17, 2007

(65) Prior Publication Data

US 2008/0099102 A1 May 1, 2008

Related U.S. Application Data

(60) Provisional application No. 60/863,096, filed on Oct. 26, 2006.

(51) Int. Cl.
*A01G 23/08* (2006.01)
(52) U.S. Cl. .................................. 144/336; 144/4.1
(58) Field of Classification Search ............... 144/4.1, 144/34.1, 334, 335, 336, 34.5
See application file for complete search history.

(56) References Cited

U.S. PATENT DOCUMENTS

| | | | | |
|---|---|---|---|---|
| 3,910,326 | A | * | 10/1975 | Tucek ................. 144/34.5 |
| 3,911,981 | A | * | 10/1975 | Tucek ................. 144/34.5 |
| RE29,235 | E | * | 5/1977 | Kurelek ................ 144/4.1 |
| 4,153,087 | A | * | 5/1979 | Stoychoff ............. 294/106 |
| 4,793,389 | A | | 12/1988 | Sigouin et al. |
| 5,004,026 | A | | 4/1991 | MacLennan et al. |
| 5,109,900 | A | | 5/1992 | Gilbert |
| 5,113,919 | A | | 5/1992 | MacLennan |
| 5,161,588 | A | | 11/1992 | Hamilton |
| 5,697,412 | A | | 12/1997 | Kurelek |
| 5,794,674 | A | | 8/1998 | Kurelek |
| 5,931,210 | A | | 8/1999 | Kurelek |
| 6,363,980 | B1 | | 4/2002 | Kurelek |
| 6,578,610 | B2 | | 6/2003 | Ristolainen |
| 7,174,932 | B2 | * | 2/2007 | Mauchlen ............. 144/34.1 |

FOREIGN PATENT DOCUMENTS

CA          2 143 155        7/2001

* cited by examiner

*Primary Examiner*—Shelley Self
(74) *Attorney, Agent, or Firm*—Miller, Matthias & Hull

(57) ABSTRACT

A tree felling head including a gathering arm and a bunching finger. In various embodiments the bunching finger may include inner and outer arms pivotally coupled together with the inner arm also pivotally coupled to a frame portion of the felling head. A biasing member, e.g. a compression spring, urges pivotal movements of the inner arm toward (and/or away from) the accumulation area of the felling head. An actuator connected to the outer arm reciprocally helps urges movement of the finger into and out of the accumulation area of the felling head. In various embodiments, a coupling of the actuator to the outer arm permits folding pivotal movement between the arms when retraction occurs and a tree inhibits outer sweeping movement of the outer finger. Said folding resulting in withdrawal of the outer finger from behind the inhibiting tree.

20 Claims, 4 Drawing Sheets

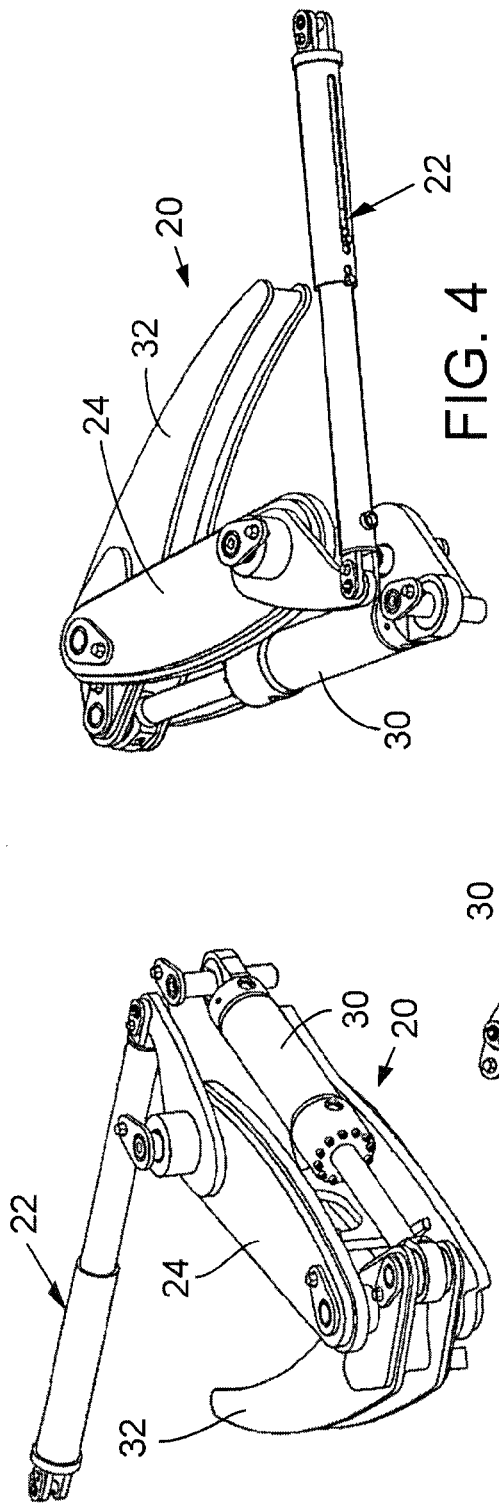
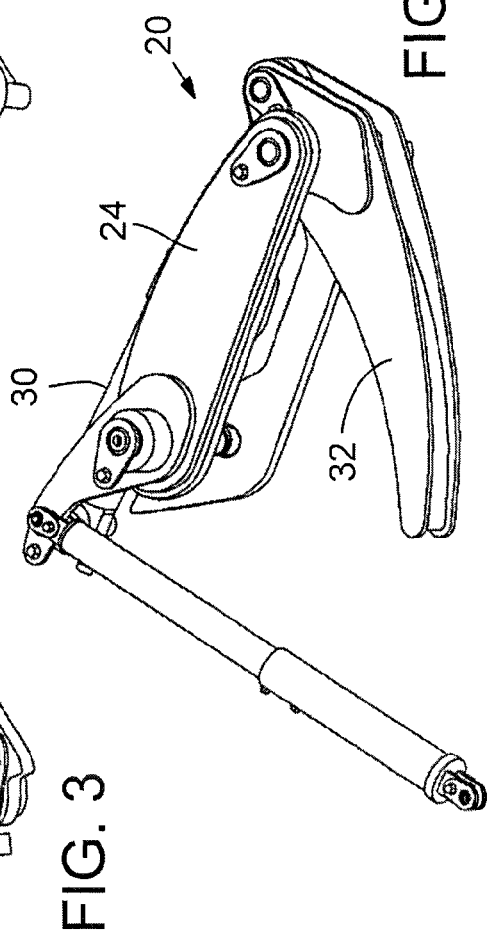
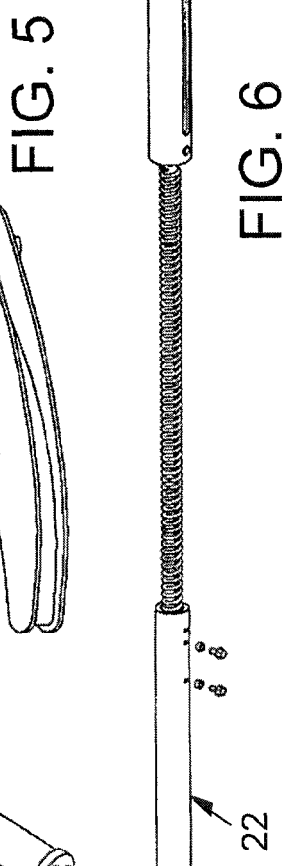

TREE FELLING HEAD

RELATED APPLICATION

1. The present application is a non-provisional application of provisional application No. 60/863,096, filed on Oct. 26, 2006, entitled "TREE FELLING HEAD," and claims priority to said provisional application. The specification of said provisional application is also hereby fully incorporated by reference in its entirety, except for those sections, if any, that are inconsistent with this specification

TECHNICAL FIELD

Embodiments of the invention pertain to tree felling head assemblies, and in particular to coupling a biasing member between the frame and an inner arm of the bunching finger to urge the bunching finger towards an accumulation area.

BACKGROUND

A modern felling head generally consists of a frame with a large accumulating area, a device for severing trees, and two sets of arms for gathering and holding trees. One arm/arms (the gather arm), is a rigid body that rotates about a point in the frame and is used for pulling trees into the accumulation area after they are severed. The other arm/arms (the bunching finger), is a hinged member that rotates about a different point on the frame and is used to hold severed trees in the accumulation area while another is being severed.

In operation, after the first tree has been severed and moved into the accumulation area by the gather arm the bunching finger is then actuated to come in contact with this tree and secure it in the accumulation area. The gather arm can now be opened so that another tree can be severed. As the second tree is severed, it is pulled into the accumulation area and pulled tight against the bunching finger which remains positioned in the accumulation area. The bunching finger is then retracted/reset. To accomplish this reset, the bunching finger has to fold in a manner to clear the first two trees that were severed and are being held in the accumulation area by the gather arm. Once the bunching finger has been opened a sufficient distance to clear the first and second trees severed, (still being held by the gather arm), the bunching finger reverses and engages both severed trees. This cycle continues until the accumulation area is full.

In the felling head as described, the bunching finger generally consists of inner and outer arms. The inner arm rotates about a point located on the frame. The outer arm rotates about the distal end of the inner arm. This rotation of the outer arm provides the folding motion to open and close entry to the accumulation area and thus hold the severed trees during the bunching process described above. The rotation of the inner arm of the bunching finger can undesirably change the position of the outer arm relative to the frame and such can change the amount of accumulation area the outer arm sweeps.

In order for a felling head, with the bunching finger and gather arm on opposite sides of the centerline of the machine, to properly sweep the accumulation area with the bunching finger, the inner arm must travel to the extent of its rotation towards the accumulation area before any relative rotation between the inner and outer arm occurs. Any deviation from this causes the outer arm to close prematurely resulting in an unsecured tree Other designs have used different approaches to try to cause the bunching finger to have proper timing, such that there is generally no relative motion between the inner and outer fingers before the inner finger has reached the extent of its rotation. One such design utilizes a near over center condition to force the inner arm closed before the outer rotates. A precise arrangement of components is required to achieve this near over center condition. The result is a bunching finger that may or may not sweep the accumulation area correctly, given different static and dynamic variables.

A further drawback to the current design arises when the bunching finger is being reset after clearing the previously cut tree. In order to clear the previously cut tree as the bunching finger is being retracted, the inner arm must travel away from the extent of its rotation. At the same time, the angle of rotation between the inner and the outer arms is decreasing. This relative motion continues until the bunching finger has cleared the previously cut tree. The design then relies on an extension spring that is connected to the inner and outer arm to rotate the outer arm back to its near over center starting position.

During this period of time when the outer arm is being pulled back to its starting position, there is no force causing the inner arm to travel to the extent of it's rotation towards the accumulation area. This degree of freedom creates an infinite number of possibilities where the position of the inner arm relative to the frame is indeterminate. If the bunching finger's direction is reversed in one of these areas, the path of the bunching finger is unpredictable. The result is the possibility of the entire accumulation area not being swept and trees not being properly retained.

Essentially, the current configurations have no definitive way to return the inner arm to the extent of its rotation. While the extension spring causes rotation between the inner and outer fingers, which can help return the two to the near over center condition, due to geometry constraints, the only true over center position is when the cylinder is fully retracted. So in normal operation, the operator must fully open the arm, even though this may not be required to clear the tree, then close the arm tight against the trees in the accumulation area. This results in operational inefficiencies.

A further drawback of current designs is that the extension spring (to reset the position of the outer finger relative to the inner finger) suffers premature failures. Due to the geometry of the current design, this spring can be stretched to over 100% of its original length. The stress values generated and the frequencies they occur result in a failure that occurs often.

DRAWINGS

FIGS. 3-6 are perspective views of certain components of the tree harvesting head of FIGS. 1 and 2.

DETAILED DESCRIPTION OF EMBODIMENTS OF THE INVENTION

Figure 1:
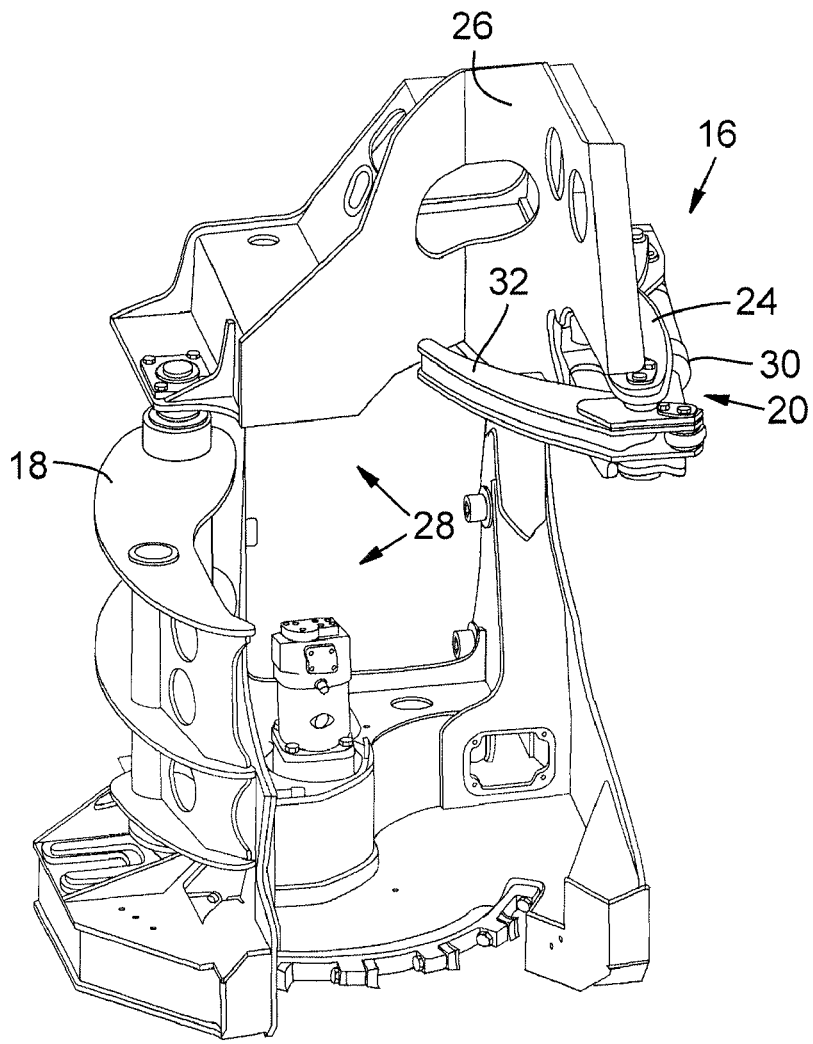
FIG. 1 is a perspective view of a tree harvesting head incorporating an embodiment of the invention.
Figure 2:
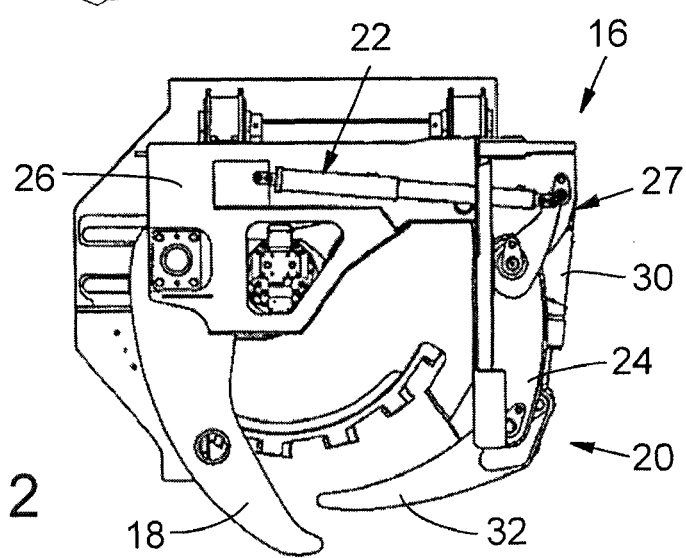
FIG. 2 is a plan view of the harvester head of FIG. 1.
Figure 7:
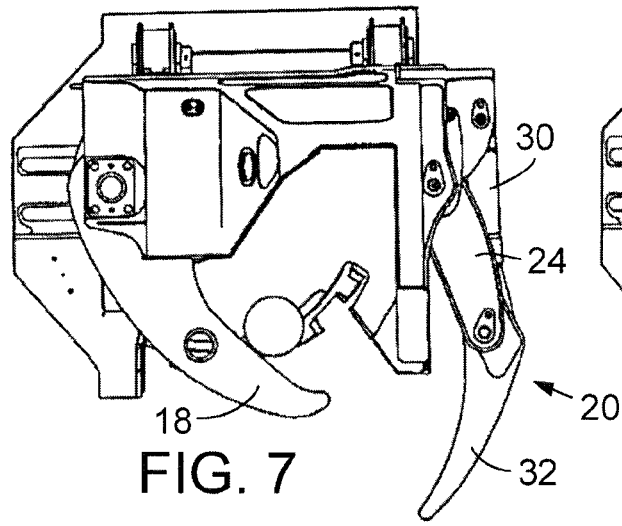
FIGS. 7-14 are views of the tree harvesting head of FIG. 2 illustrating the relationship of the gather arm and bunching finger in different stages of operation.
Figure 8:
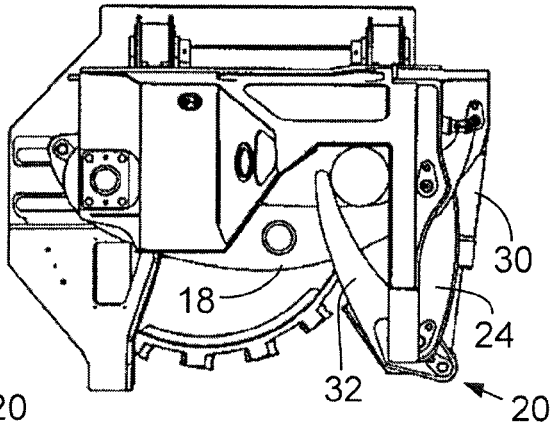
Figure 9:
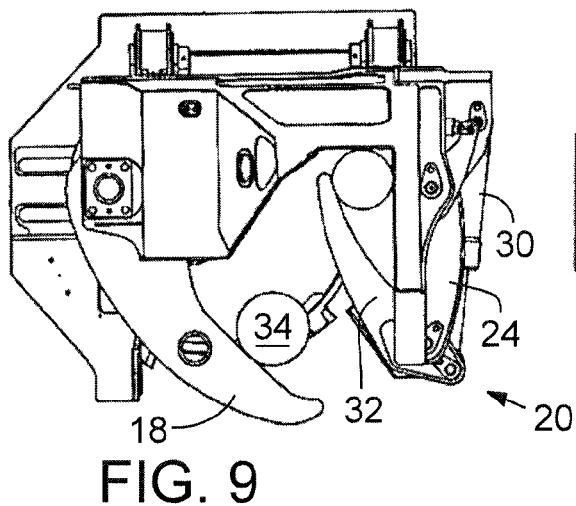
Figure 10:
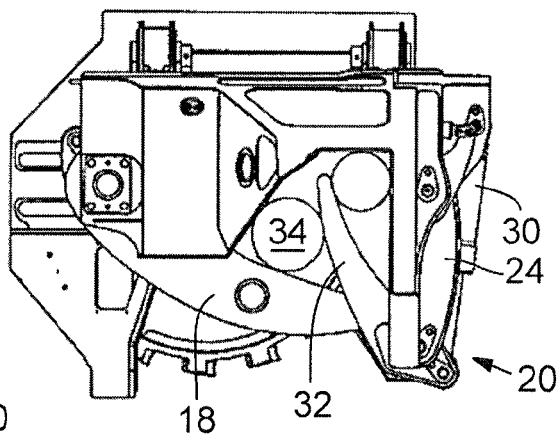
Figure 11:
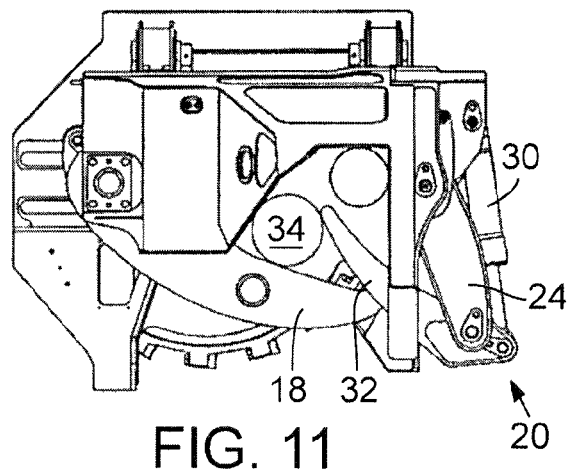
Figure 12:
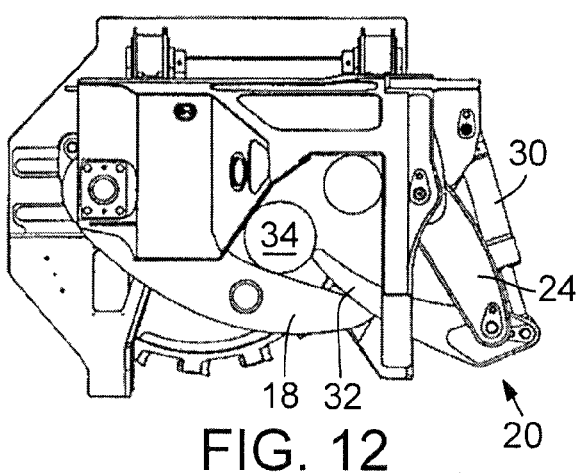
Figure 13:
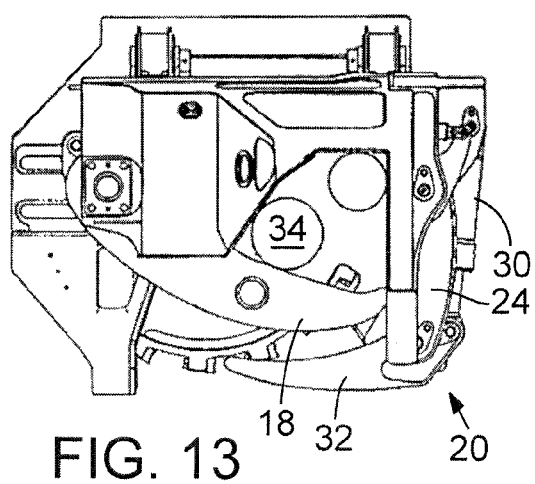

Embodiments of the present invention will be readily understood by the following written description along with reference to the accompanying drawings. Embodiments of the invention are illustrated by way of example and not by way of limitation in the accompanying figures.

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

For the purposes of the present invention, the phrase "A/B" means A or B. For the purposes of the present invention, the phrase "A and/or B" means "(A), (B), or (A and B)." For the purposes of the present invention, the phrase "at least one of A, B, and C" means "(A), (B), (C), (A and B), (A and C), (B and C), or (A, B and C)." For the purposes of the present invention, the phrase "(A)B" means "(B) or (AB)", that is, A is an optional element.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Reference is now made to FIGS. 1-6 of the drawings. Various embodiments may include a felling head 16 having a gathering arm 18 and a bunching finger 20. The bunching finger 20 may include a biasing member 22 (e.g. a spring such as illustrated in FIG. 6) attached between the inner arm 24 and frame 26 that applies a generally constant force on the inner arm 24 urging it to travel to the extent of it's rotation towards the accumulation area 28. An actuator or bunching cylinder 30 may be connected between the frame 26 and the outer arm 32 of the bunching finger 20.

As the bunching finger cylinder 30 is being extended, the biasing member 22 helps force the inner arm 24 to rotate towards the accumulation area 28. Because the force of the biasing member 22 keeps the inner arm 24 rotating in pace with, for example, an elongating hydraulic cylinder 30 attached to the outer arm 32 and frame 26, there is generally little to no relative rotation between the inner arm 24 and outer arm 32 of the bunching finger 20. This general motion continues until the inner arm has reached the extent of its rotation, e.g. a stop is engaged. This stop may be provided at various locations and take many different forms. As an example only, a protrusion may be located as indicated by reference 27 in FIG. 2 which limits further extension of the spring 22. In various embodiments, the stop may be of a variety of configurations and may act on the inner arm, the biasing member, or other component in order to cease inward pivotal movement of the inner arm. The outer arm 32 then begins to rotate about the inner arm 24 sweeping the accumulation area as intended.

Reference is now made to FIGS. 7-14. In various embodiments, when the bunching finger 20 is retracted to clear the previously cut tree, (see the drawing sequence of FIGS. 10-12) the outer arm 32 may push against the previously cut tree 34, which may tend to create a resultant force on the inner arm 24 of the bunching finger 20. This resultant force may be generally greater than and opposite to the force imposed by the biasing member 22. As a result, the inner arm 24 may rotate away from the accumulation area and the angle between the inner arm 24 and outer arm 32 decreases. Note the changing position of arm 24 in the drawing sequence.

Figure 14:
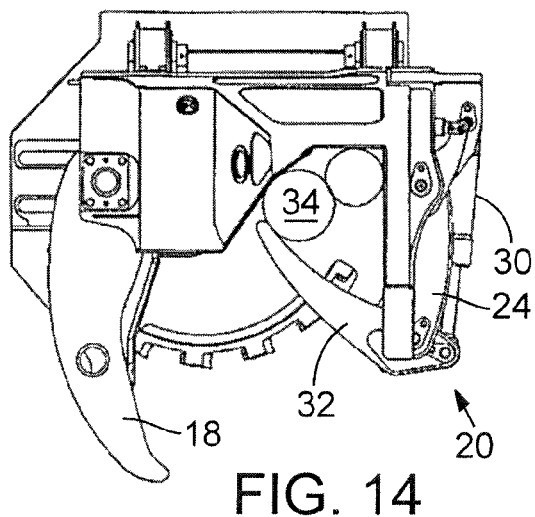

This general motion may continue until the outer arm 32 has cleared the previously cut tree. (FIG. 12) Once the outer arm 32 has cleared the previously cut tree, the resultant force of the actuator 30 acting on the inner arm 24 may be eliminated and the biasing member 22 may then urge the inner arm to rotate back towards the extent of its rotation towards the accumulation area. (FIG. 13) The direction of the bunching cylinder can then be reversed, the accumulation area may be properly swept, and the trees may be properly retained. (FIG. 14)

In various embodiments, a variety of biasing members may be used. In one embodiment, a compression spring may be used to urge the inner arm 24 towards the accumulation area (e.g. FIG. 6). In other embodiments, an extension spring may be used. As illustrated in the example embodiments, an appropriate linkage may be used to couple the biasing member 22 to the inner arm 24 in order to provide an appropriate force and urge movement of the inner arm towards the accumulation area. Further, in embodiments where the size envelope for the spring is not limited by the geometry of the arm, the spring can be sized to match a desired amount of travel, which can help reduce the stress values on the components and thus result in a longer spring life.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

The invention claimed is:

1. A tree felling head, comprising:
 a frame at least partially defining an accumulation area;
 a gathering arm and a bunching finger, both mounted to the frame in cooperative relation for receiving and accumulating severed trees, wherein the gathering arm generates a gathering force for engagement and movement of the severed trees to the accumulation area, and wherein the bunching finger includes an inner arm pivotally coupled to the frame and an outer arm pivotally coupled to the inner arm;
 an actuator coupled between the frame and outer arm for producing pivotal movement of the outer arm for sweeping said accumulation area;

a biasing member extending between the inner arm and frame for urging pivotal movement of the finger toward the accumulation area; and a stop positioned to arrest inward pivotal movement of the inner arm.

2. The tree felling head as defined in claim 1, whereby a mechanical linkage between the actuator and outer arm permits pivotal folding of the outer arm relative to the inner arm upon retraction of the finger from the accumulation area.

3. The tree felling head as defined in claim 1, wherein the biasing member is a compression spring.

4. The tree felling head as defined in claim 1, wherein the stop acts on the inner arm or on the biasing member in order to stop pivotal movement.

5. In a tree felling head used for sequential severing and gathering of multiple trees, a bunching finger comprising:

an inner arm pivotally coupled to a felling head frame having an accumulation area and adapted to pivot toward and away from said accumulation area between a retracted position and a stop position;

an outer arm pivotally coupled to the inner arm and adapted to pivotally sweep said accumulation area from the stop position of the inner arm;

a biasing member directly connecting the inner arm to the felling head frame and providing a constant biasing force on the inner arm during felling and bunching operation of the felling head, wherein the biasing force is configured to urge inward pivotal movement of the inner arm;

an actuator coupled between the outer arm and the felling head frame at an offset connection and which manipulates pivoting of the inner arm through restraint of the biasing member and which manipulates sweeping action of the outer arm from the stop position; and said actuator and biasing member cooperatively producing retraction of the bunching finger when retraction is resisted by a resultant force.

6. A tree felling head, comprising:
a frame defining an accumulation area;
a pivotal gathering arm;
a pivotal bunching finger, the bunching finger comprising pivotally coupled inner and outer arms;
a biasing member connecting the frame to the pivotal bunching finger and continuously biasing the inner arm toward the accumulation area;
a stop coupled to the frame and positioned to prevent rotation of the inner arm into the accumulation area; and
an actuator having an offset coupling to the outer arm and selectively controlling inner and outer pivotal movement of the bunching finger including permitted pivotal movement of the inner arm to stop, and continued pivotal sweeping movement of the outer arm through the accumulation area.

7. A method of felling trees, comprising:
providing a tree felling head including a frame defining an accumulation area, a gathering arm and a generally opposed bunching finger pivotally mounted to the frame, the bunching finger including an inner arm having an inner pivotal coupling between the inner arm and the frame and outer arm having an outer pivotal coupling between the outer arm and the inner arm, a biasing member extending between the frame and inner arm and urging the inner arm toward the accumulation area, an actuator coupled between the frame and outer arm, and a stop that arrests inward pivoting of the inner arm into the accumulation area;

cutting a tree;
gathering the cut tree into the accumulation area with the gathering arm;
urging inward pivotal movement of the inner arm with the biasing member;
arresting inward pivotal movement of the inner arm by the stop;
urging continued inward movement of the outer arm with the actuator after the inner arm movement has been arrested;
holding the cut trees with the bunching finger;
releasing the gathering arm to gather additional cut trees.

8. The method of felling trees of claim 7, wherein urging inward movement of the outer arm is induced by the actuator and further generating inner pivoting of the outer arm relative to the inner arm for sweeping engagement of the severed trees in said accumulation area.

9. The method of felling trees of claim 7, further comprising using the actuator and producing retractive pivotal movement of the inner and outer arms away from the accumulation area.

10. The tree felling head of claim 1, wherein the inner arm is biased toward the accumulation area and movable away from the accumulation area.

11. The tree felling head of claim 1, wherein the inner arm is biased into a substantially perpendicular position away from the frame, but is able to pivot away from the accumulation area from the perpendicular position to enable the outer arm to swing past a gathered tree.

12. The tree felling head of claim 1, wherein the biasing member and the stop cooperate to bias the inner arm into a substantially perpendicular position extending away from the frame.

13. The tree felling head of claim 12, wherein the outer arm is able to sweep the entire accumulation area while the inner arm is in the substantially perpendicular position away from the frame.

14. The tree felling head of claim 1, wherein the gathering arm and bunching finger both directly extend from the frame, the frame being a unitary piece of material.

15. The tree felling head of claim 5, wherein the biasing member is spring.

16. The tree felling head of claim 5, wherein the actuator is coupled directly between the frame and the outer arm.

17. The tree felling head of claim 5, further including a stop preventing rotation of the inner arm into the accumulation area.

18. The tree felling head of claim 6, wherein the biasing member is a spring.

19. The method of claim 7, wherein the biasing member is a spring.

20. The method of claim 7, wherein the stop arrests movement of the inner arm such that the inner arm cannot enter the accumulation area.

* * * * *